United States Patent [19]

Novorsky et al.

[11] Patent Number: 4,749,833
[45] Date of Patent: Jun. 7, 1988

[54] INDUCTION HEATING FOR ADHESIVE BONDING

[75] Inventors: Donald E. Novorsky, Pleasant Ridge; Robert J. Bednarz, Sterling Heights, both of Mich.

[73] Assignee: Tocco, Inc., Boaz, Ala.

[21] Appl. No.: 83,630

[22] Filed: Aug. 7, 1987

[51] Int. Cl.⁴ ............................................. H05B 6/40
[52] U.S. Cl. ............................ 219/10.43; 219/10.53; 219/85 A; 219/10.490; 456/272.4; 456/274.2; 456/379.7; 456/380.2
[58] Field of Search ............... 219/10.43, 10.41, 9.5, 219/10.53, 10.49 R, 10.79, 85 R, 85 A; 156/272.4, 272.2, 273.9, 274.2, 379.7, 379.8, 380.2

[56] References Cited

U.S. PATENT DOCUMENTS

| | | | |
|---|---|---|---|
| 3,705,284 | 12/1972 | Binard | 219/10.49 R |
| 3,923,580 | 12/1975 | Leatherman | 219/10.53 X |
| 4,035,547 | 7/1977 | Heller, Jr. et al. | 219/10.53 X |
| 4,341,936 | 7/1982 | Virgin | 219/10.79 X |
| 4,571,472 | 2/1986 | Pollack et al. | 219/10.53 X |
| 4,602,139 | 7/1986 | Hutton et al. | 219/10.43 |
| 4,633,051 | 12/1986 | Olson | 219/10.49 R |
| 4,650,947 | 3/1987 | Hutton et al. | 219/10.41 |
| 4,654,495 | 3/1987 | Hutton et al. | 219/10.41 |

*Primary Examiner*—Philip H. Leung
*Attorney, Agent, or Firm*—Body, Vickers & Daniels

[57] ABSTRACT

A method and apparatus is disclosed for obtaining an improved bond between two structural members. Spherical particles, preferably graded steel shot, are interspersed within the adhesive and move in sliding and rolling contact relative to one another to establish an accurate space between opposing face surfaces of the structural members as the structural members are brought into pressured contact with one another. An induction coil may then be used to accurately heat the spherical particles and thus establish a heat source to thermally set the adhesive from within the spaced gap between the structural members established by the spherical particles.

22 Claims, 4 Drawing Sheets

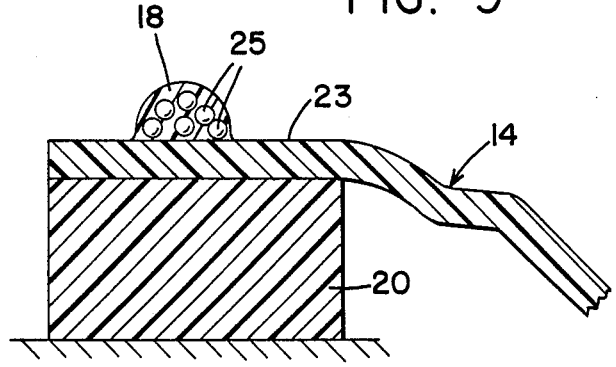
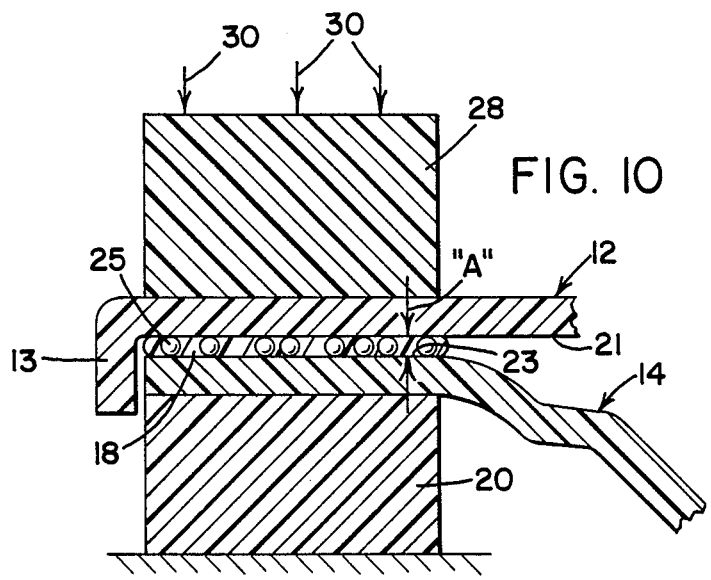

ic field which can generate heat, bond plastic to plastic or plastic action

INDUCTION HEATING FOR ADHESIVE BONDING

FIELD OF THE INVENTION

This invention relates in general to an improved method and apparatus for bonding a structural assembly and more particularly to bonding by means of a thermally set adhesive which is cured by an induction heater.

The invention is particularly applicable to those applications where it is desired to maintain an accurate spacing between the bonded members, especially for induction heating purposes and will be described with particular reference thereto. However, the invention has broader applications and may be used in any non-induction application where an accurate spacer arrangement will result in an improved bond.

BACKGROUND OF THE INVENTION

For the past several years a number of new developments have occurred in manufacturing processes for composite panel structures by the use of thermal set adhesives. More specifically, in the automotive field, the use of thermal set adhesives is being investigated for the manufacture of body component assemblies such as doors, trunks and deck lids in place of conventional spot weld and resistance welding techniques. Generally speaking, one of the current techniques being investigated is to place the adhesive on one of the panels and accurately position the other panel (or panels with adhesive also therebetween) by means of especially made jigs and fixtures. Portions of the panels overlying the adhesive are then heated by induction heating to cause heat to be transferred to the adhesive or alternatively, the adhesive, itself, may be heated. In either event, the adhesive is thermally set so that the assembled components are held together in a reasonably firm manner for the remainder of the finishing operations. Depending on the type of adhesive used, a firm bond results either as a function of time and/or when the body is exposed to an elevated curing temperature in the paint baking oven. One such arrangement disclosing this technique in greater detail may be found in U.S. Pat. No. 4,602,139 to Hutton et al which is incorporated herein by reference in its entirety.

A number of difficulties have been experienced with respect to setting the thermal adhesive. These difficulties principally arise from either applying too much heat, or too little heat or too much of an uneven heat to the adhesive joint which either results in failure to set the adhesive or in overheating of the adhesive which may adversely affect its retention properties or even, in some instances, a distortion in the sheet metal itself as a result of the normal thermal expansion and contraction of the sheet metal. Several approaches to solve such problems have centered about various jig and fixture designs which not only hold the panels in their preferred position but also maintain the inductor coil air gap at its proper position. Other proposed solutions have attempted to control the power to the induction coil and/or frequency thereof. Still other proposed solutions have been to investigate and formulate different adhesives which could better withstand the variations in heat encountered in the assembly process. For example, U.S. Pat. Nos. 4,650,947 and 4,654,495 to Hutton et al also incorporated by reference herein disclose a two-stage adhesive with induction heating used to trigger the first "tack" curing stage while the permanent bond is established in the second stage when a blowing agent is activated to produce a foam resin. All such solutions have met with limited degrees of success. None of the solutions is universally acceptable.

The use of induction heating for bonding thermal set adhesives is significantly limited when bonding a metal panel to a plastic panel or a plastic panel to a plastic panel. Such applications exist not only in the automotive field but in countless other fields as well. Since there is little if any molecular action within plastics induced by an alternating field which can generate heat, attempts to adhesively bond plastic to plastic or plastic to metal by induction heating have been to mix small metal flakes in the adhesive so that the metal flakes can be inductively heated to set the adhesive. This approach has achieved only limited success because of the tendency of the metal flakes to become non-uniformly dispersed within the adhesive resulting in uneven induction heating causing certain adhesive portions to become overheated and other portions to be insufficiently heated. From a conceptual analysis, the suspension problem is difficult if not impossible to correct. The problem is significantly aggravated when a thermal bond is to be effected between a metal and a plastic component. In such application, the induced flux tends to heat the metal component more than the metal flakes to promote overheating that portion of the adhesive in contact with the metal component. This in turn requires the positioning of the coil and the frequencies at which the induction coil operates to be closely controlled to regulate the depth of heating effected by the coil.

Apart from any considerations of induction heating, it can be appreciated that if the space between the panels is not flush or if the spacing filled by the adhesive is significantly varied, the curing or set time of the adhesive can be adversely affected, simply because a greater mass of adhesive is involved. This problem occurs in especially configured panels where corners are involved or where bends might produce spaces which the adhesive must fill so that the processing time is longer than that which might otherwise be achieved.

SUMMARY OF THE INVENTION

It is thus one of the principal objects of the invention to provide a method and apparatus to effect a secure adhesive bond between either plastic members, a plastic and metal member or two metal members.

This object along with other features of the invention is achieved in an adhesive bond between opposing face surfaces of either plastic members, metal members or a plastic and metal member. A plurality of small, spherical, metal magnetic particles having a high degree of permeability are interspersed within the adhesive placed, preferably as a strip or alternatively as a gel, on one of the face surfaces of one of the bonded members. The opposing face surface is brought into contact with the adhesive and a conventional mechanism is used to exert a compression force between the face surfaces resulting in the adhesive spreading out and the spherical particles moving relative to one another until the gap between the members is reduced in size to that approximately equal to the diameter of the spherical particles. Thus an accurate spacing filled with a consistent amount of adhesive is provided to achieve consistent bonding of the members. An induction coil may then be used to heat the spherical particles which function as heat sinks to transfer the heat by direct conduction to a thermally set adhesive thus establishing an arrangement which provides an accurate spacing of the face surfaces while also heating the bond from "within" to overcome the problems noted above.

In accordance with another feature of the invention, the spherical particles comprise graded steel shot which possess ideal dimensional tolerances for the application disclosed herein while providing an inexpensive, easily obtained commercial source of supply.

In accordance with yet another feature of the invention, the inductor can be a conventional coil surrounding both bonded members. However, when a plastic member is bonded to a metal member, or for use in space constricting applications, the coil is placed only on one side of one of the bonded members, preferably the plastic member, to minimize any excessive or detrimental heating of the metal member.

In accordance with yet another aspect of the invention, when metal to metal or plastic to metal members are bonded to one another, the shot particles are preferably manufactured from a metal having higher magnetic characteristics than that of the metal members to assure concentration of the flux within the shot and to minimize adverse heating of the metal members.

It is thus another object of the invention to provide an inexpensive spacer mechanism for use in adhesives which, in its broader sense, need not be a thermally set adhesive.

It is another object of the invention to provide an induction heating arrangement for thermally setting an adhesive bond between plastic members.

It is another object of the invention to provide an induction heating arrangement for thermally setting an adhesive which minimizes thermal distortion of the bonded parts.

It is another object of the invention to provide in an induction heating arrangement for a thermally set adhesive, an arrangement which utilizes a spacer feature to take up or compensate for dimensional part and surface variations.

It is yet another object of the invention to provide in a thermally set adhesive bond a mechanism for accurately controlling the spacing between the opposing face surfaces of the bonded members.

Still another object of the invention resides in an adhesively bonded arrangement wherein the adhesive is heated principally in the gap between the bonded members to promote a thorough curing of the adhesive in an energy efficient process.

DETAILED DESCRIPTION OF THE DRAWINGS

The invention may take physical form in certain parts and arrangement of parts, preferred embodiments of which will be described in detail and illustrated in the accompanying drawings which will form a part hereof and wherein:

FIGS. 9 and 10 are views similar to FIGS. 2 and 4, respectively, illustrating the use of the invention as a means to control the spacing between the bonded members.

DETAILED DESCRIPTION OF THE INVENTION

Figure 1:
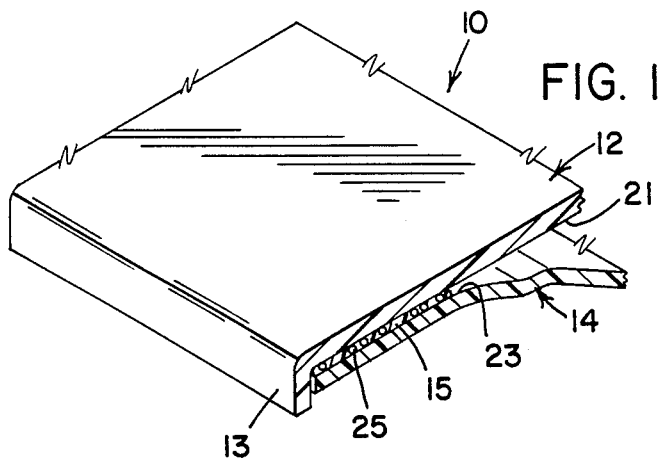
FIG. 1 is a perspective view of a bonded assembly resulting from the use of the invention.

Referring now to the drawings wherein the showings are for the purpose of illustrating preferred embodiments of the invention only and not for the purpose of limiting the same, FIG. 1 shows a bonded assembly 10 comprising, generally speaking, a first member or panel 12 and a second member or panel 14 joined together by an adhesive bond 15. As used herein, the term "adhesive" means adhesives, resins and the like including epoxies, acrylics and polyvinyl chlorides which are suitable for joining, gluing or cementing structural members 12, 14 together. "Thermal set" means any adhesive which may be hardened or cured at least partially by the application of heat even if hardening or curing of the adhesive would occur solely by the lapse of time. Also included within the definition of "adhesive" and "thermal set" are two-stage or multi-stage adhesives of the type disclosed in U.S. Pat. Nos. 4,654,495 and 4,650,947. The adhesive in and of itself does not form a part of this invention. A list of conventional adhesives which may be used in conjunction with this invention may be found in U.S. Pat. No. 4,602,139. Similarly, support members 12, 14 which ideally are platelike or panel structures may be formed of any suitable material which can be bonded to another material by the use of adhesives and the term "plastic" is meant to include all plastic, ceramic and non-metallic materials which can be adhesively bonded and "metal" is intended to include all ferrous and non-ferrous metals which can be adhesively bonded.

Figure 2:
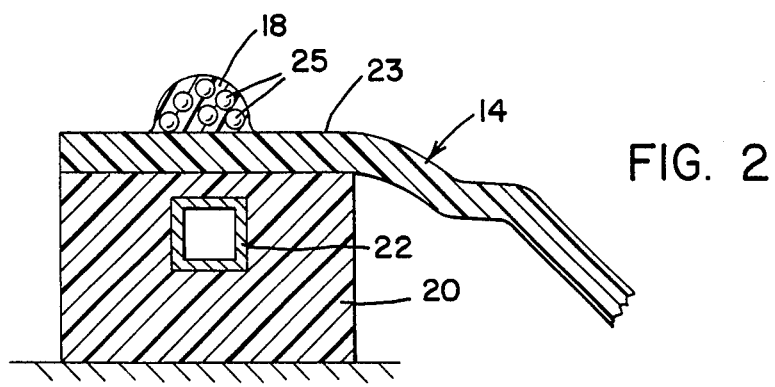
FIG. 2 is a cross-sectional schematic view illustrating the adhesive with shot interspersed therein applied to one of the member's face surfaces.

Referring now to FIG. 2 second structural member 14 rests on a plastic or ceramic block 20 which houses or encapsulates one of the turns 22 of an induction heater. On the opposite side of second member 14 or its face surface 23 is disposed an adhesive 18. The adhesive 18 is preferably in the form of a gel having a sufficient body or density to support or suspend a plurality of spherical particles 25 interspersed therein. It is contemplated that a bead of adhesive 18 could be laid down on facing surface 23 and a plurality of small, discreet spherical particles 25 simply sprinkled onto the bead. Alternatively, conventional inert fillers could be mixed with adhesive 18 and adhesive 18 could be supplied in a preformed tubular or ribbon shape with spherical particles 25 accurately positioned therein and the adhesive ribbon with particles 25 would be applied to face surface 23. Preferably spherical particles 25 are magnetic, metallic shot and preferably graded steel shot. As is conventionally known, shotting produces spherical particles which are graded in size by passing through various screen sizes and it is contemplated that the steel shot used in the invention will be that passing through lower numbered SAE screens such as numbers 7 or 8. As is well known, diameters of graded shot are controlled in the neighborhood of 0.01 inches to 0.02 inches which is sufficient for the purpose of the invention. That is, the variations in size established by the specified diameter tolerances in graded steel shot is well suited for induction heating where the induction gap must be closely controlled and the external forces provide a means for taking up the slight diametrical differences established by the tolerances.

Figure 3:
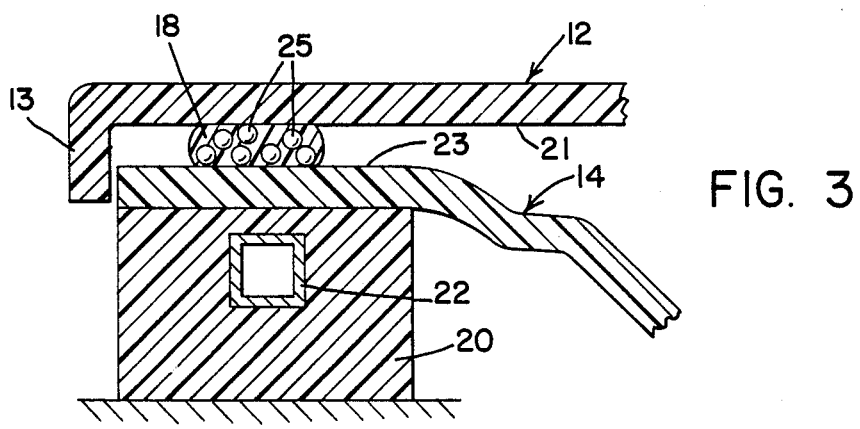
FIG. 3 is a cross-sectional schematic view showing the second member positioned in relation to the first member.

As best shown in FIG. 3, structural member 12 is then placed on top of adhesive 18 and properly aligned with second structural member 14. To assist in the alignment, first structural member 12 could have its end bent as a tab as shown at 13 although tab 13 is not essential to the working of the invention. As soon as first member 12 is positioned relative to second member 14, the free standing height of adhesive 18 is reduced as a function of the weight to first structural member 12 and spherical particles 25 begin to align themselves by a rolling and a sliding action relative to one another within the space between face surface 23 of second member 14 and face surface 21 of first member 12.

Figure 4:
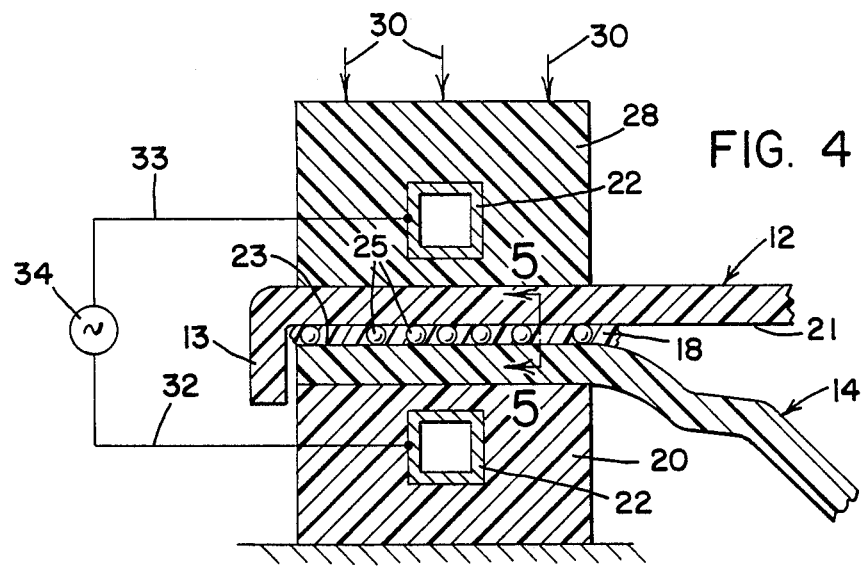
FIG. 4 is a cross-sectional schematic view showing the inductor and the plastic members in their desired bonded position.
Figure 5:
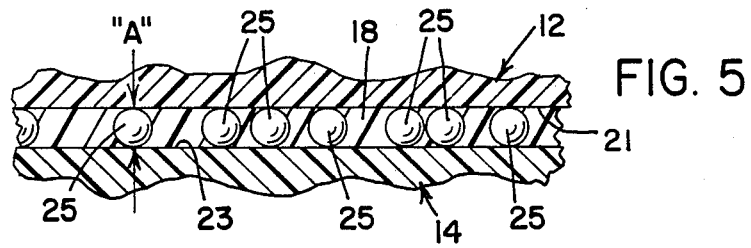
FIG. 5 is a cross-sectional view taken along lines 5—5 of FIG. 4 showing the typical spacing between the members controlled by the graded shot.

Referring now to FIGS. 4 and 5 a top insulating block 28 carrying a coil turn 22 is pushed against first member 12 by any conventional means (hydraulic or pneumatic cylinders, etc.) to exert a force represented by arrows 30. Compressive force 20 causes spherical particles 25 to roll and slide against one another until the gap between first and second structural members 12, 14 is reduced to approximately distance "A" as shown in FIG. 5 which is approximately the distance of the diameter of spherical particles 25. Alternatively stated, the layers of particles 25 present in FIG. 2 are reduced under the compressive forces 30 until a single layer of spherical particles 25 as shown in FIG. 5 exists. It should also be noted that the gel or putty consistency of adhesive 18 tends to stick or cling to particles 25 as adhesive 18 spreads out in the reducing space between first and second structural members 12, 14. When coil turns 22 are connected by leads 32, 33 to an appropriate source of alternating current such as schematically represented generator 34, spherical particles 25 are heated, and spherical particles 25 thus act as a heat sink or source which, importantly, is located within the gap between structural members 12, 14 to heat by conduction adhesive 18 and effect thermal setting thereof.

In FIG. 4 first and second structural members 12, 14 are plastic and generator 34 is preferably set to operate within radio frequency ranges to heat spherical particles 25. The mass of particles 25 is significantly larger than the metal flakes suspended within the adhesive in the prior art and since particles 25 fill a much larger portion of the gap between support members 12, 14 heating of the adhesive 18 is more accurately controlled.

Figure 6:
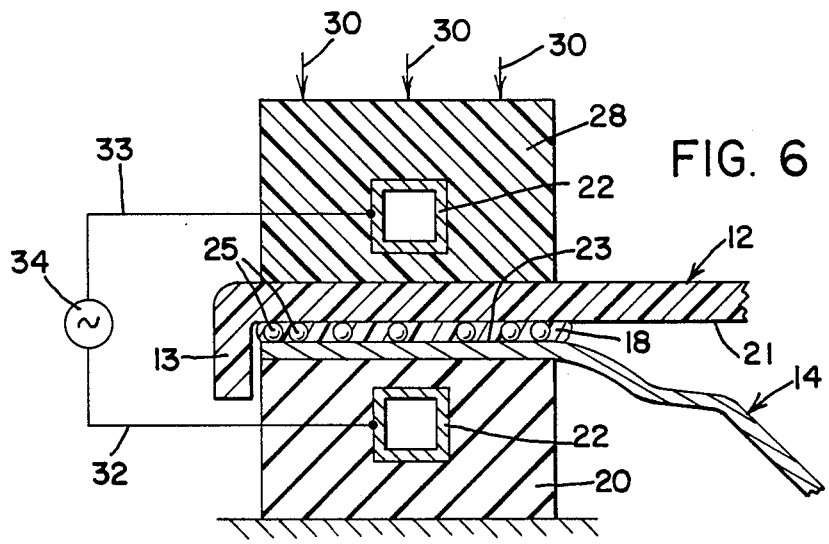
FIG. 6 is a view similar to FIG. 4 showing the invention applied to a plastic and metal member bonded to one another.
Figure 7:
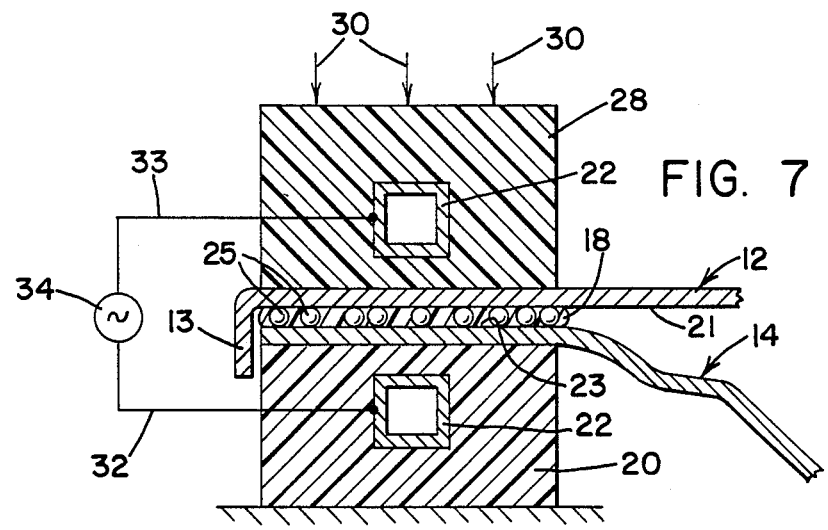
FIG. 7 is a view similar to FIGS. 4 and 6 showing the invention applied to metal members bonded to one another.

FIG. 6 illustrates the suitability of the invention to bond a plastic structural member to a metal structural member and FIG. 7 illustrates the application of the invention in bonding a metal structural member to a metal structural member and like reference numbers will be used to designate similar parts and components where applicable. In both applications illustrated, it is desirable that the magnetic qualities of particles 25 are greater than the magnetic characteristics of the steel structural member(s). In addition, the frequency of oscillator 34 is lowered into the audio-radio frequency range to concentrate the flux about spherical particles 25 as intensely as possible. For such application, the metallurgical characteristics of the shot may have to be modified by adding conventional known alloying elements or other materials to insure higher magnetic properties or magnetic permeability of the shot than that of structural members 12, 14 which generally are formed from cold rolled sheet steel. By establishing a magnetic characteristics differential and centering the flux in between structural members 12, 14, the limiting factor in the control of the bonding is the heating of shot particles 25 thus minimizing any adverse effects resulting from expansion or contraction incurred in heating structural members 12, 14. It should be noted that in the metal-to-metal application of FIG. 7, the spacing of the shot and the compression of the metal members 12, 14 is such that, in effect, a composite solid structure is obtained so that the induction current can, in effect, pass through one of the members to heat the shot. It is also contemplated that one of the members 12, 14 may be non-ferrous.

Figure 8:
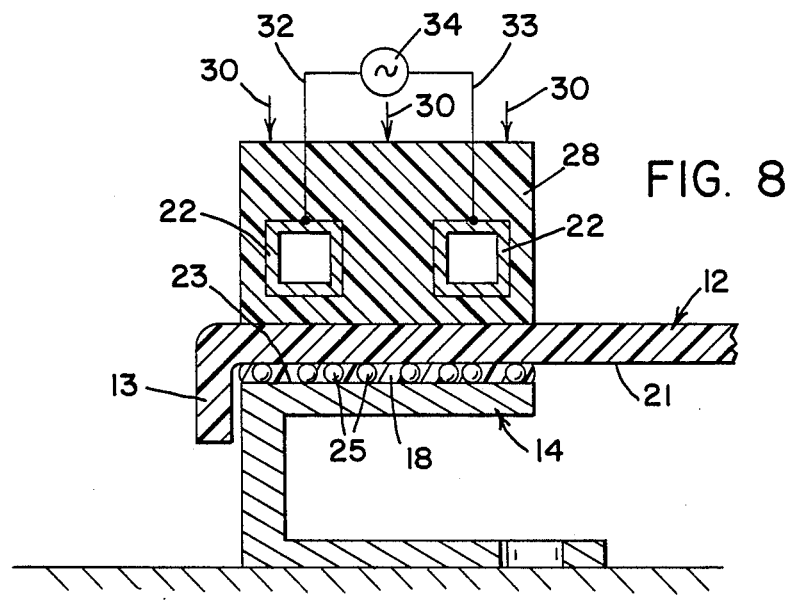
FIG. 8 is a view similar to FIG. 6 showing an alternative inductor design for a plastic-to-metal bond.

FIG. 8 illustrates an alternative coil arrangement specifically applicable to bonding a plastic structural member 12 to a metal structural member 14. This type of application frequently occurs in the automotive industry where a plastic trim item is to be mounted to a post or a pillar structural member such as that which might exist on an automotive door. In this type of an application space considerations generally prohibit the accurate positioning of an induction coil surrounding the assembly. In such applications, coil turns 22 (in accordance with conventional practice) lie in a single plane and the "pancake" coil may be configured in any desired closed loop shape or configuration to achieve the desired heating pattern resulting from alternating current generator 34. An additional benefit arising from such a coil application is that the flux can be more easily concentrated or controlled to heat only spherical particles 25 and not structural member 14 or with minimal heating of structural member 14 so that establishing differential magnetic characteristics of the shot and the metal structural member 14 need not be of significant concern. As to general operating concepts it is contemplated that the general ranges of temperature, frequency, power input, heat times and inductor sporing specified in the prior art patents will be applicable to the induction units utilized in the operation of the invention disclosed herein.

FIGS. 9 and 10 illustrate an alternative embodiment or application of the invention and like reference numbers will designate like parts where applicable. In the alternative embodiment, adhesive 18 is not or need not necessarily be a thermal set adhesive. Adhesive 18 with spherical particles 25 interspersed therein is disposed on facing surface 21 in a manner similar to that described with reference to FIG. 2 and in FIG. 10 force 30 is exerted against top insulating block 28 in a manner similar to that described with reference to FIGS. 4 and 5 to establish a closely defined space "A" dictated by the size of spherical particles 25. Force 30 is maintained until adhesive 18 is at least set or cured whether or not such curing or setting occurs solely as a function of time or solely as a function of temperature from an external heat source such as a paint booth. A common feature of all of the applications described is that spherical particles 25, once heated, whether by induction heating or from an external source, function as a heat sink or source to thermally set adhesive 18. Heating spherical particles 25 by induction obviates the problems discussed above which occur when the support members are metallic.

Having thus described our invention, it is apparent that many modifications may be incorporated into the arrangement disclosed without departing from the spirit or essence of our invention. For example, while the invention has particularly economic utility with respect to the use of graded shot as spherical particles 25, certain applications may require the use of larger sized spherical particles and it is our intention to include such larger particle sizes within the scope of our invention. Other applications may require that structural members 12, 14 establish line contact between face surfaces 21, 23. In such application it would be obvious to indent one or both structural members or make a race within one or both structural members and even utilize larger sized spherical particles within the race. In such applications, spherical particles 25 would first be placed into the race or indentation, and an adhesive in almost a liquid form could be poured thereon. Also, for larger sized spherical particles 25 the spherical particles could additionally function as the mechanism for aligning structural members 12, 14 with one another. It is our intention to include all such modifications and alternative arrangements within the scope of our invention.

It is thus the essence of our invention to provide a method and apparatus for an adhesive bonded assembly which accurately controls the spacing of the structural members bonded while also being able to function as susceptors for induction heating to thermally set the adhesive bond.

Having thus described the invention, it is hereby claimed:

1. Apparatus bonding together an assembly of a first and second member, each member having a face surface adjacent the other member and an adhesive which can be thermally set interposed between said face surfaces, said apparatus comprising:
   (a) a plurality of small discreet spherical metal particles of predetermined diameter interposed between said face surfaces and interspaced within said adhesive;
   (b) means for moving said face surface of said first member towards said face surface of second member until a substantially single layer of said particles are firmly grasped between said face surfaces to control the spacing between said face surface to a distance equal to said predetermined diameter; and
   (c) means for inductively heating said particles whereby said adhesive is thermally set.

2. Apparatus of claim 1 wherein said particles are graded steel shot.

3. Apparatus of claim 2 wherein said induction heating means includes an induction coil of an electrically conductive metal surrounding said first and second members and a power supply producing an alternate current having a frequency high enough to heat said shot to a temperature of at least equal to the setting temperature of said adhesive.

4. Apparatus of claim 2 wherein said induction heating means includes a pair of induction coils of an electrically conductive metal arranged to be disposed in a spaced apart relationship on the same side of one of said member's facing surface and a power supply producing an alternating current having said shot to a temperature at least equal to the setting temperature of said adhesive.

5. Apparatus of claim 1 wherein said first member is plastic.

6. Apparatus of claim 5 wherein said second member is plastic.

7. Apparatus of claim 5 wherein said second member is metal.

8. Apparatus of claim 1 wherein said first and second members are metal.

9. The apparatus of claim 1 wherein said means for inductively heated are operated at radio frequencies.

10. A method of bonding together an assembly of a first and second member having opposed face surfaces to be secured to one another, said method comprising the steps of:
    (a) providing a thermal setting adhesive to a portion of at least one of the member's face surfaces;
    (b) mixing a plurality of shot having magnetic characteristics with said adhesive;
    (c) bringing said opposing face surfaces of said members together to dispense said shot within said adhesive into a general layer of single shot thus establishing a spacing equal to the diameter of the shot between said opposing face surfaces;
    (d) heating said shot by induction heating whereby said shot conveys sufficient heat to thermally set said adhesive and bond said members to one another.

11. The method of claim 10 wherein said heating occurs at radio frequency.

12. The method of claim 10 wherein said induction heating is controlled so that said shot is not heated in excess of the setting temperatures of said adhesive.

13. The method of claim 10 wherein said induction coils for said induction heating step are positioned on one side of one of said members.

14. The method of claim 10 wherein said induction coils are for said induction heating step surround both of said members.

15. The method of claim 10 wherein said shot is graded, steel shot.

16. The method of claim 10 wherein one of said surfaces is modified to receive a portion of said shot.

17. The method of claim 10 wherein one of said members is a substantially non-magnetic plastic material.

18. The method of claim 17 wherein the other member is a metal member, said shot having a higher degree of susceptibility than said metal surfaces.

19. The method of claim 18 wherein said members are metal, said shot having a higher degree of susceptibility than said members.

20. The method of claim 17 wherein said other member is made from a substantially non-magnetic plastic material.

21. A method of bonding together of a first and second member in an accurate relationship comprising the steps of:
    (a) providing an adhesive to a portion of one of the member's face surfaces;
    (b) mixing a plurality of small, generally spherical particles within said adhesives;
    (c) pressing said face surfaces together to cause said particles to roll relative to one another into generally a single layer of said particles between said face surfaces to establish a desired space relationship; and
    (d) maintaining said surfaces in said spaced relationship until said adhesive has set.

22. The method of claim 21 wherein said adhesive is a thermal set adhesive and further including the step of heating said spherical particles by induction often step c has been completed to effect a thermal set of said adhesive.

* * * * *

UNITED STATES PATENT AND TRADEMARK OFFICE
CERTIFICATE OF CORRECTION

PATENT NO. : 4,749,833

DATED : June 7, 1988

INVENTOR(S) : Donald E. Novorsky, et al.

It is certified that error appears in the above-identified patent and that said Letters Patent is hereby corrected as shown below:

Col. 6, line 47, "sporing" should read --spacing--.

Col. 7, line 48, "surface" should read --surfaces--.

Col. 8, line 8, "heated" should read --heating--.

Col. 8, line 18, "dispense" should read --disperse--.

Col. 8, line 31, delete "said".

Col. 8, line 34, delete "said".

Col. 8, line 55, after "spherical" insert --metal--.

Col. 8, line 56, "adhesives" should read --adhesive--.

Col. 8, line 65, "often" should read --after--.

Signed and Sealed this

Eighth Day of May, 1990

Attest:

HARRY F. MANBECK, JR.

*Attesting Officer*    *Commissioner of Patents and Trademarks*